United States Patent
Suino et al.

(10) Patent No.: US 7,667,713 B2
(45) Date of Patent: Feb. 23, 2010

(54) IMAGE PROCESSING METHOD, IMAGE PROCESSING APPARATUS AND COMPUTER-READABLE STORAGE MEDIUM

(75) Inventors: Tooru Suino, Kanagawa (JP); Takanori Yano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 956 days.

(21) Appl. No.: 10/944,030

(22) Filed: Sep. 17, 2004

(65) Prior Publication Data

US 2005/0088669 A1 Apr. 28, 2005

(30) Foreign Application Priority Data

Sep. 19, 2003 (JP) .............................. 2003-328637

(51) Int. Cl.
| | |
|---|---|
| G09G 5/02 | (2006.01) |
| H04N 7/01 | (2006.01) |
| H04N 5/46 | (2006.01) |
| H04N 1/387 | (2006.01) |
| H04N 1/46 | (2006.01) |
| G06K 9/34 | (2006.01) |
| G06K 9/46 | (2006.01) |

(52) U.S. Cl. ....................... 345/600; 345/619; 345/581; 345/660; 348/441; 348/445; 348/556; 348/390; 358/538; 358/539; 358/452; 382/171; 382/173; 382/232; 382/282

(58) Field of Classification Search ................ 345/698, 345/699, 660, 382, 428, 581, 606, 618, 670–671, 345/547–548, 600; 348/384, 387, 390, 395, 348/441, 445, 538, 556, 561; 358/521–525, 358/528, 537, 538–539, 452–453; 382/171, 382/173, 232, 282; 715/700, 764, 788, 800, 715/815

See application file for complete search history.

(56) References Cited

U.S. PATENT DOCUMENTS

| | | | | | |
|---|---|---|---|---|---|
| 5,818,531 | A | * | 10/1998 | Yamaguchi et al. | 375/240.2 |
| 6,097,842 | A | * | 8/2000 | Suzuki et al. | 382/232 |
| 6,104,434 | A | * | 8/2000 | Nakagawa et al. | 375/240.16 |
| 6,266,042 | B1 | * | 7/2001 | Aratani | 345/698 |
| 6,501,441 | B1 | * | 12/2002 | Ludtke et al. | 345/1.1 |
| 6,668,078 | B1 | * | 12/2003 | Bolle et al. | 382/164 |
| 6,778,698 | B1 | * | 8/2004 | Prakash et al. | 382/164 |
| 7,352,907 | B2 | * | 4/2008 | Sakuyama et al. | 382/240 |
| 2001/0033392 | A1 | * | 10/2001 | Utsunomiya | 358/1.15 |
| 2002/0159644 | A1 | * | 10/2002 | Sakuyama | 382/240 |
| 2003/0068089 | A1 | * | 4/2003 | Sano et al. | 382/232 |

(Continued)

FOREIGN PATENT DOCUMENTS

| | | |
|---|---|---|
| JP | 11-088866 | 3/1999 |
| JP | A 2003-224846 | 8/2003 |

OTHER PUBLICATIONS

Japanese Office Action for Japanese Patent Application No. JP2003-328637, dated Sep. 9, 2009, 2 pages *No English translation provided*.

*Primary Examiner*—Wesner Sajous
(74) *Attorney, Agent, or Firm*—Blakely, Sokoloff, Taylor & Zafman LLP

(57) ABSTRACT

An image processing apparatus is provided with a process unit to carry out a resolution conversion process and an image division process with respect to an input image, and a control unit to control a division number of the image division process depending on a size of an image display region and a resolution after the resolution conversion process. The division number indicates a number of divided image portions into which the input image is divided into by the image division process. The control unit may control the division number of the image division process depending on an image size of the input image in addition to the size of the image display region and the resolution after the resolution conversion process.

8 Claims, 16 Drawing Sheets

U.S. PATENT DOCUMENTS

| | | | |
|---|---|---|---|
| 2003/0142872 A1* | 7/2003 | Koyanagi | 382/236 |
| 2003/0218776 A1* | 11/2003 | Morimoto et al. | 358/2.1 |
| 2004/0061883 A1* | 4/2004 | Kanatsu | 358/1.9 |
| 2004/0212843 A1* | 10/2004 | Kodama et al. | 358/426.01 |
| 2006/0001905 A1* | 1/2006 | Utsunomiya | 358/1.15 |
| 2006/0188175 A1* | 8/2006 | Takiguchi et al. | 382/284 |

* cited by examiner

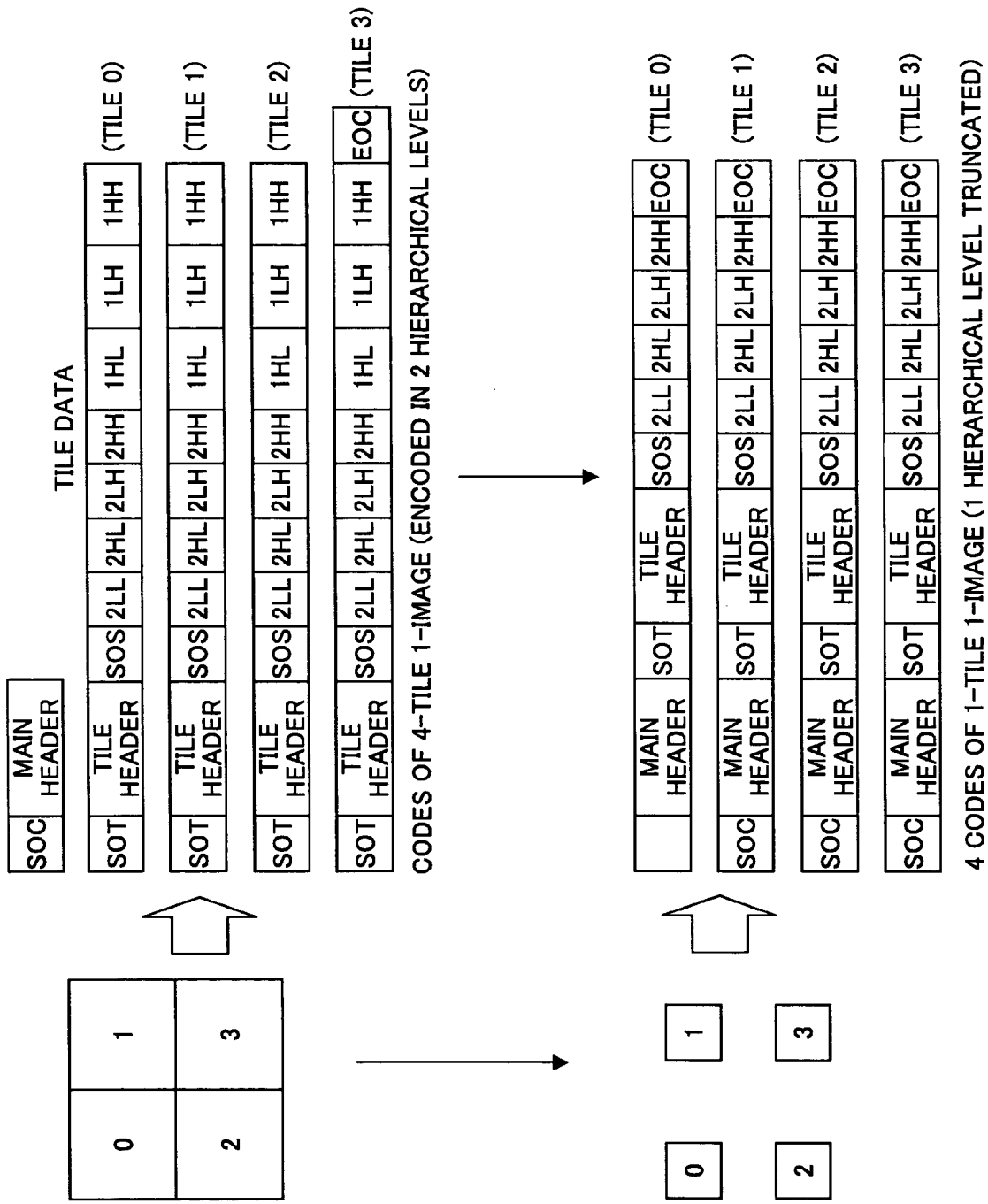

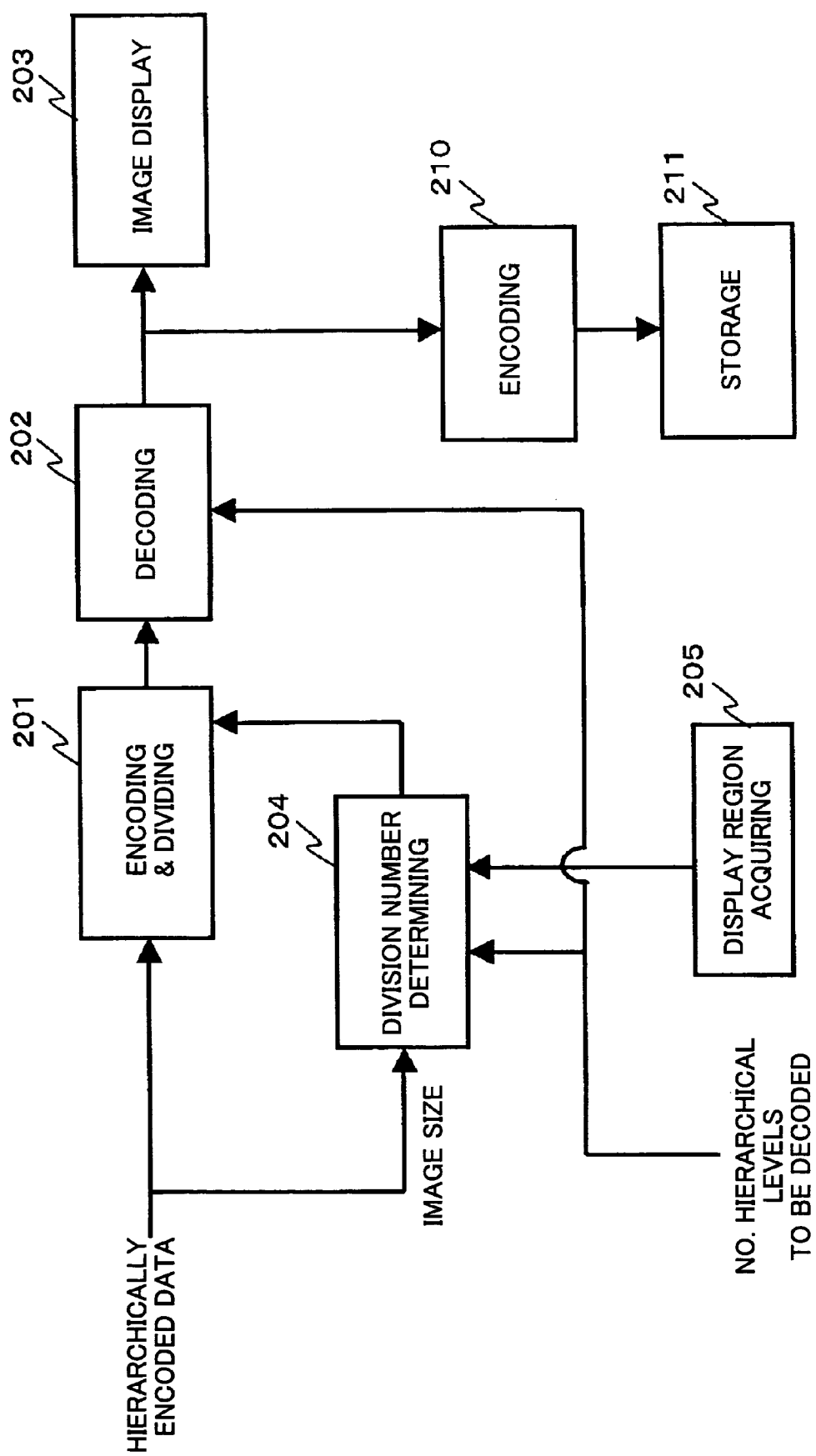

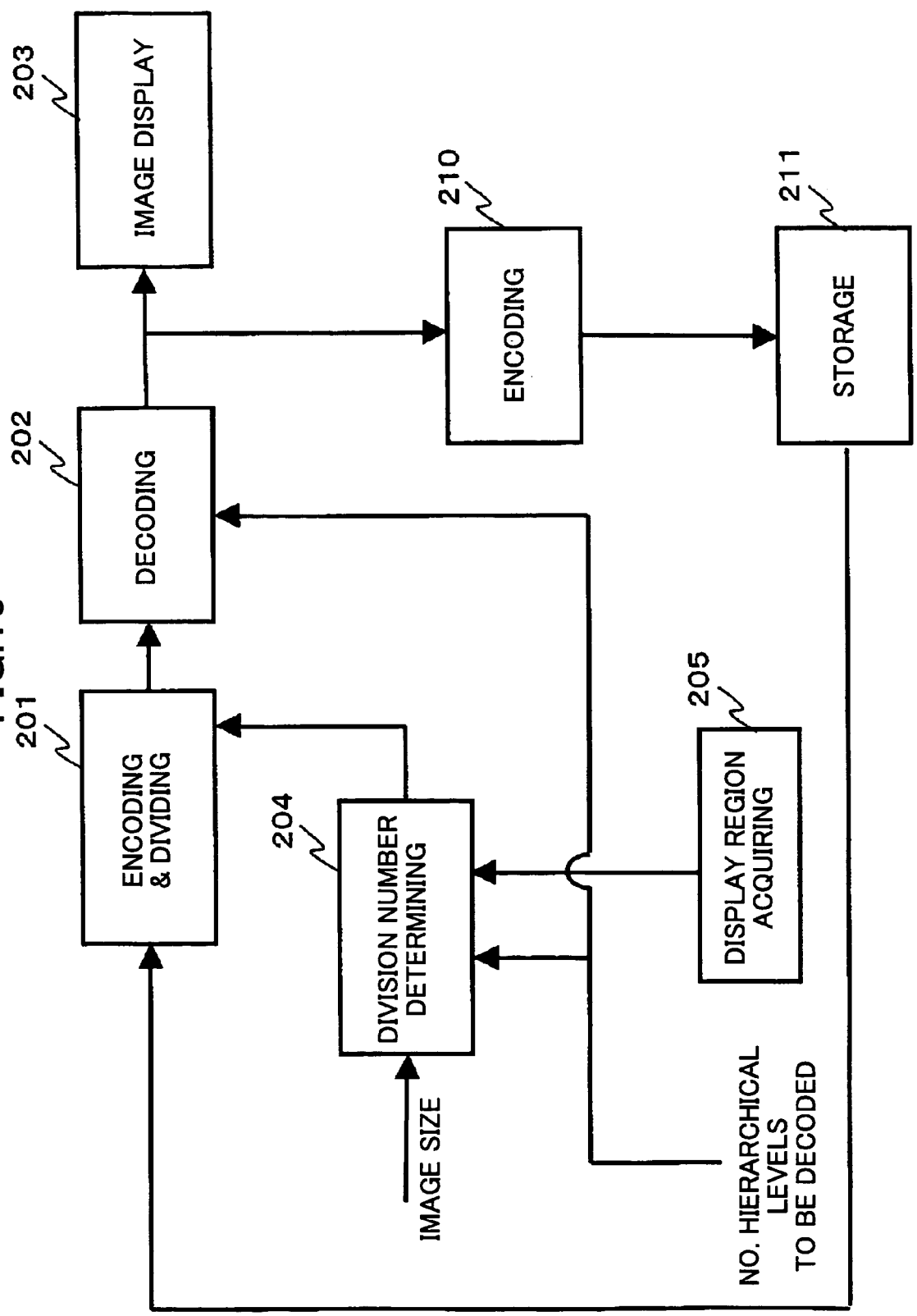

IMAGE PROCESSING METHOD, IMAGE PROCESSING APPARATUS AND COMPUTER-READABLE STORAGE MEDIUM

The present application claims the benefit of Japanese Patent Application No. 2003-328637, filed Sep. 19, 2003, the entire contents of which are hereby incorporated by reference.

BACKGROUND OF THE INVENTION

1. Field of the Invention

The present invention generally relates to image processing methods, image processing apparatuses and computer-readable storage media, and more particularly to an image processing method for facilitating display or inspection of an image that has a large size compared to an image display region, an image processing apparatus which employs such an image processing method, and a computer-readable storage medium that stores a program for causing a computer to process an image by such an image processing method.

2. Description of the Related Art

In order to realize high-speed display of ultra high-definition images, a Japanese Laid-Open Patent Application No. 11-88866 proposes a technique for storing the images in the form of a maximum resolution file, a first intermediate resolution file, a second intermediate resolution file, . . . , with each file storing the image in image blocks segmenting the image in a matrix arrangement.

When an extremely large image is to be displayed as it is on a display unit, problems are encountered. For example, scroll operations must be repeated a plurality of times in order to display a target portion of the image on the display unit. In addition, it takes time to carry out the process of displaying the image, and it is difficult to realize a high-speed display or inspection.

Furthermore, when viewing an extremely large image, there are various needs, such as viewing the entire image and viewing only a portion of the image in detail. For example, in the case of a map image, the needs may be to view a regional map or a street map. When viewing the street map, the required resolution should enable identification of the details. On the other hand, when viewing the regional map, it may be more desirable to reduce the resolution if necessary so that a wide range can be inspected simultaneously.

SUMMARY OF THE INVENTION

An image processing method, image processing apparatus and computer-readable storage medium are described. In one embodiment, the apparatus comprises a process unit configured to carry out a resolution conversion process and an image division process with respect to an input image, and a control unit configured to control a division number of the image division process depending on a size of an image display region and a resolution after the resolution conversion process, said division number indicating a number of divided image portions into which the input image is divided into by the image division process.

BRIEF DESCRIPTION OF THE DRAWINGS

FIG. 14 is a diagram for illustrating the image division in code level and resolution conversion in the third embodiment of the image processing apparatus;

FIG. 15 is a system block diagram showing a fourth embodiment of the image processing apparatus according to the present invention; and FIG. 16 is a system block diagram showing a modification of the fourth embodiment of the image processing apparatus.

DESCRIPTION OF THE PREFERRED EMBODIMENTS

Figure 1:
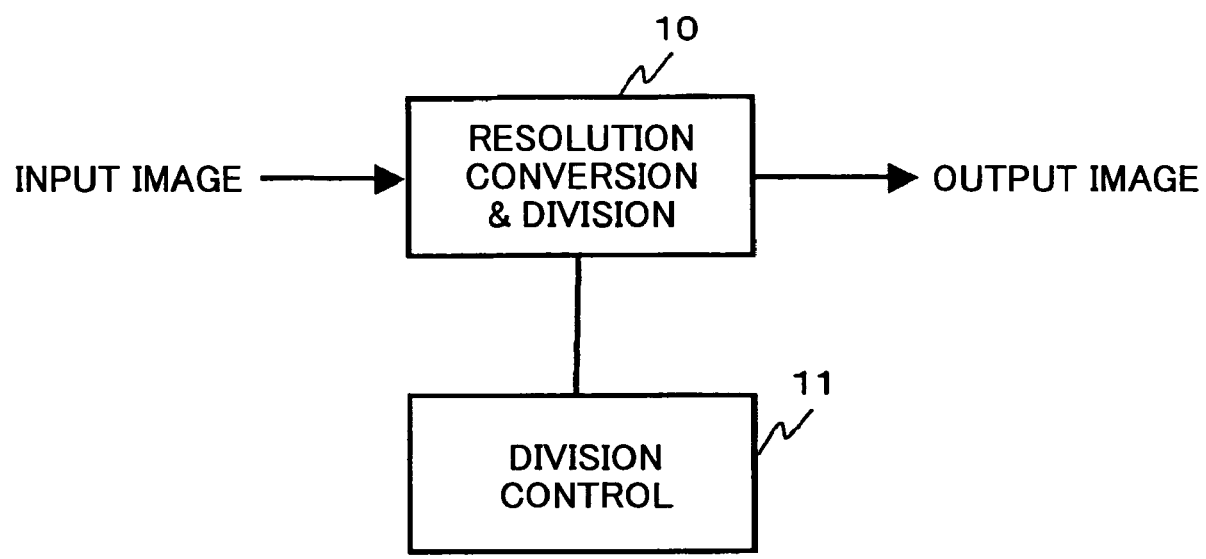
FIG. 1 is a system block diagram showing a basic structure of an image processing apparatus according to the present invention.

Accordingly, embodiments of the present invention include a novel and useful image processing method, image processing apparatus and computer-readable storage medium, in which the problems described above associated with viewing or inspecting a large image relative to a display unit are suppressed.

An embodiment of the present invention includes an image processing method, an image processing apparatus and a computer-readable storage medium, which can cope with the various needs described above, particularly associated with viewing or inspecting a large image relative to a display unit.

Embodiments of the present invention further include an image processing apparatus comprising a process unit to carry out a resolution conversion process and an image division process with respect to an input image; and a control unit to control a division number of the image division process depending on a size of an image display region and a resolution after the resolution conversion process, where the division number indicates a number of divided image portions into which the input image is divided into by the image division process. The control unit may control the division number of the image division process depending on an image size of the input image in addition to the size of the image display region and the resolution after the resolution conversion process.

Another embodiment of the present invention includes an image processing method comprising (a) carrying out a resolution conversion process and an image division process with respect to an input image; and (b) controlling a division number of the image division process depending on a size of an image display region and a resolution after the resolution conversion process, where the division number indicates a number of divided image portions into which the input image is divided by the image division process. Controlling the division number may control the division number of the image division process depending on an image size of the input image in addition to the size of the image display region and the resolution after the resolution conversion process.

Another embodiment of the present invention includes a computer-readable storage medium which stores a program for causing a computer to carry out an image processing, the program comprising a process procedure causing the computer to carry out a resolution conversion process and an image division process with respect to an input image; and a control procedure causing the computer to control a division number of the image division process depending on a size of an image display region and a resolution after the resolution conversion process, where the division number indicates a number of divided image portions into which the input image is divided into by the image division process. The control procedure may cause the computer to control the division number of the image division process depending on an image size of the input image in addition to the size of the image display region and the resolution after the resolution conversion process.

According to the present invention, it is possible to make displays and inspections suitable for large images, by carrying out the resolution conversion process and the image division process. For example, in the case of a large map image, when viewing a regional map, it is possible to generate divided image portions that cover a wide range by reducing the resolution and reducing the division number of the map image. By displaying such divided image portions, it becomes possible to efficiently inspect the regional map. On the other hand, when viewing a street map, it is possible to generate divided image portions that enable identification of detailed contents by not greatly reducing the resolution and increasing the division number of the map image. By displaying such divided image portions, it becomes possible to inspect the details of a target region in the street map. Of course, the divided image portions may be generated with the resolution and the division number of the image set to intermediate values.

In addition, since the size of the image display region is reflected to the division number of the image, it is possible to make the image display region and the divided image portions have similar or approximately the same sizes. For this reason, it is possible to inspect the divided image portions without requiring a scroll operation or, requiring virtually no (very little) scroll operation. Moreover, because the time required for the display process of the divided image portion is greatly reduced compared to that required for the original large image, it is possible to display the divided image portion at a high speed and the storage capacity required for the display process can be reduced. Since the divided image portions having suitable resolution and size are generated from the original image, the present invention does not require a storage unit with an extremely large storage capacity as was required by the technique proposed in the Japanese Laid-Open Patent Application No. 11-88866 which prestores various images that have been generated in advance.

Other objects and further features of the present invention will be apparent from the following detailed description when read in conjunction with the accompanying drawings.

FIG. 1 is a system block diagram showing a basic structure of an image processing apparatus according to the present invention. The image processing apparatus includes a resolution conversion and division block 10 which carries out a resolution conversion process and an image division process with respect to an input image, and a division control block 11 which controls a division number of the image in the image division process depending on (i) a size of an image display region and a resolution after the resolution conversion process or, (ii) a size of the image, the size of the image display region and the resolution after the resolution conversion process. The division number indicates the number of image segments (or divided image portions) into which the image is divided into by the image division process.

According to one embodiment of the present invention, the input image takes the form of pixel value data. According to another embodiment of the present invention, the input image takes a form of encoded data. According to still another aspect of the present invention, the input image takes the form of hierarchically encoded data. The resolution conversion and division block 10 may have a structure of the embodiments which will be described hereunder, for example, depending on the form of the input image. In order to cope with a plurality of different forms (or data formats) of the input image, it is of course possible to combine the structures of the embodiments, which will be described hereunder.

FIG. 1 may also be regarded as showing an image processing method according to one embodiment of the present invention. In other words, the image processing method includes a first processing operation to carry out the resolution conversion process and the image division process of the resolution conversion and division block 10, and a second processing operation to carry out the division control of the division control block 11. As described above for the image processing apparatus, particular contents of the resolution conversion process and the image division process of the first operation differ depending on the form of the input image, as will also be described hereunder in conjunction with the embodiments.

The image processing apparatus according to the present invention and the image processing method according to the present invention may be realized by one or a plurality or programs, using a general-purpose computer such as a personal computer or a device (or module) embedded type microcomputer. In other words, the present invention may be realized by the program, which causes the computer to carry out the processes of the blocks 10 and 11. A computer-readable storage medium according to the present invention stores such a program. Any type of recording media capable of storing the program in a computer-readable manner, such as magnetic disks, optical disks, magneto-optic disks and semiconductor memory elements, may be used to form the computer-readable storage medium according to the present invention.

Figure 2:
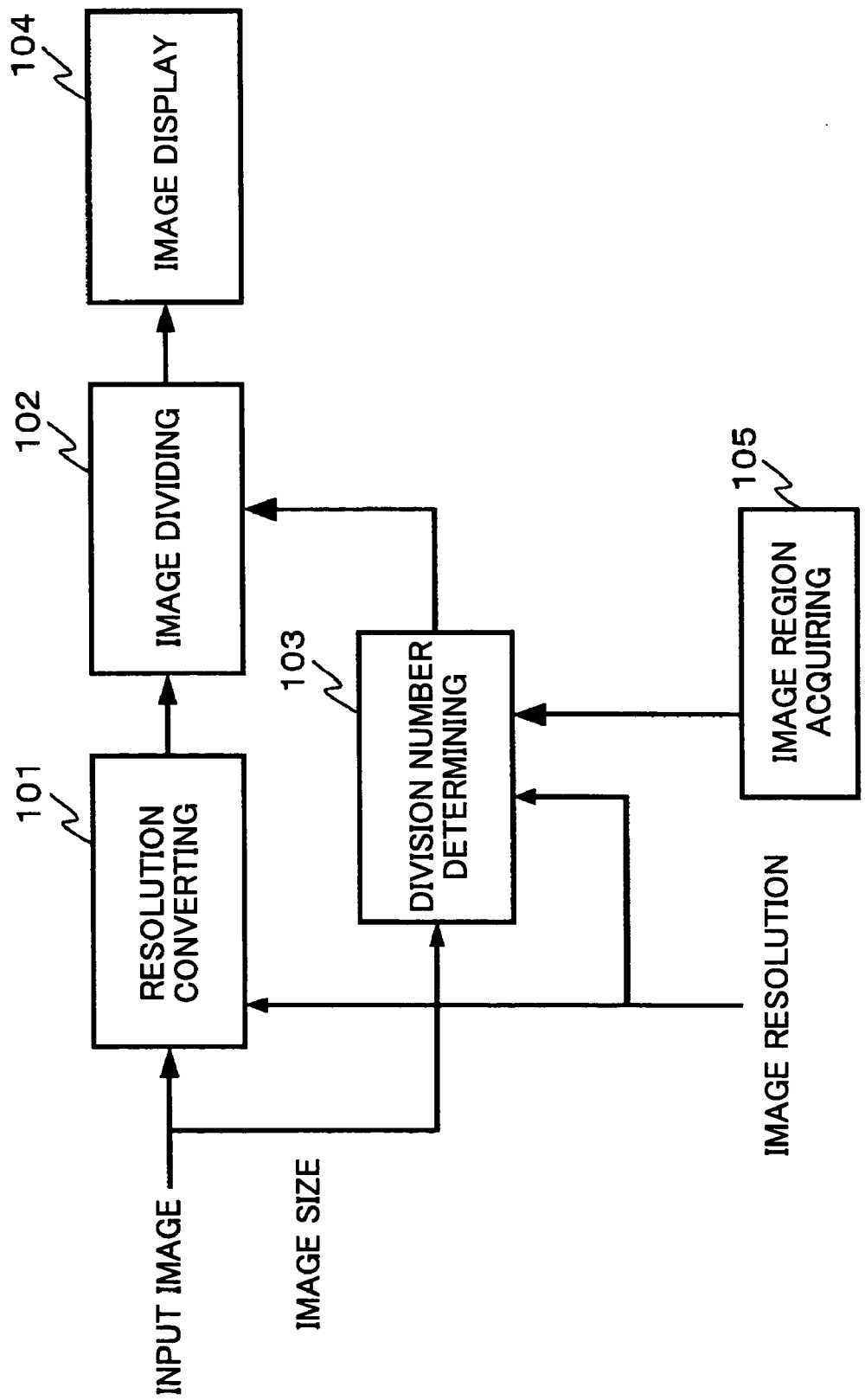
FIG. 2 is a system block diagram showing a first embodiment of the image processing apparatus according to the present invention.
Figure 3:
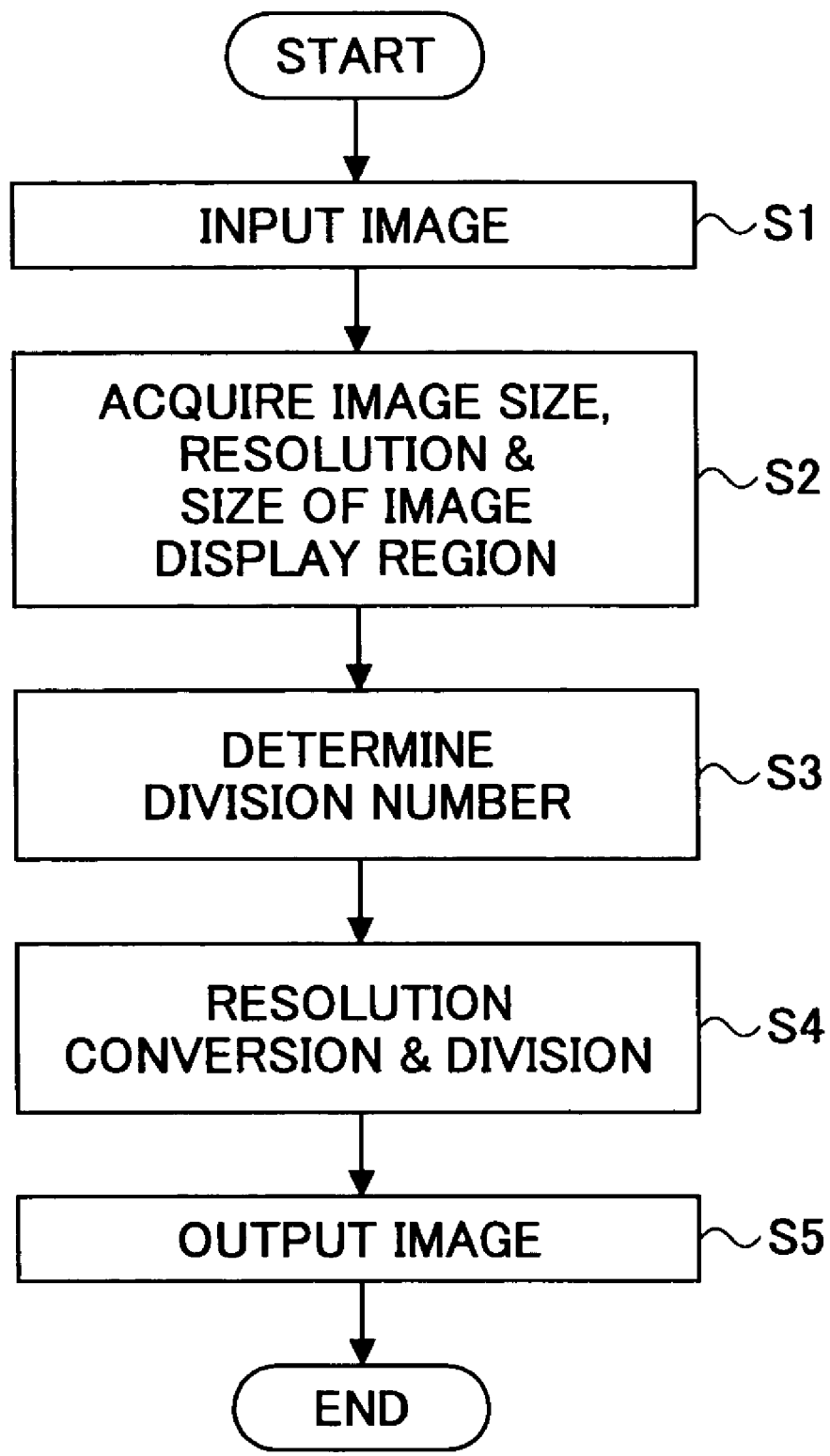
FIG. 3 is a flow chart for illustrating an operation of the first embodiment of the image processing apparatus.

FIG. 2 is a system block diagram showing a first embodiment of the image processing apparatus according to the present invention, and FIG. 3 is a flow chart illustrating an operation of the first embodiment of the image processing apparatus. In this embodiment, pixel value data of the image (that is, digital image) are input as the input image, and the resolution conversion process and the image division process are carried out with respect to the pixel value data.

In FIG. 2, a resolution converting unit 101 and an image dividing unit 102 form a unit or means for carrying out the functions of the resolution conversion and division block 10 shown in FIG. 1. A division number determining unit 103 forms a unit or means for carrying out the functions of the division control block 11 shown in FIG. 1.

The pixel value data of the input image are input to the resolution converting unit 101, and an image size of the input image is input to the division number determining unit 103. Resolution specifying information, which specifies a resolution before the resolution conversion and a resolution after the resolution conversion, such as 600 dpi→300 dpi, is also input to the division number determining unit 103 and the resolution converting unit 101. However, the resolution specifying information may specify only the resolution after the resolution conversion.

A size of an image display region is also input to the division number determining unit 103. The size of the image display region refers to a size of an image displaying window that is opened on a screen of a display unit, for example. The size of the image display region may be directly specified by a user. But in this embodiment and in embodiments that will be described later, a display region acquiring unit 105 is provided to automatically acquire the size of the image display region. For example, the display region acquiring unit 105 acquires the size of the image display region from an application program that is related to an image displaying process. The size of the image display region may vary, and for this reason, it is preferable to provide the display region acquiring unit 105 which forms a unit or means for automatically acquiring the size of the image display region.

An image display unit 104 regards each divided image that is output from the image dividing unit 102 as one page, and displays the divided images in units of pages in the image display region of the display unit. The image display unit 104 forms a unit or means for displaying the divided images in such a manner, and the image display unit 104 may be provided externally to the image processing apparatus.

Next, a description will be given of the operation of the image processing apparatus shown in FIG. 2, by referring to FIG. 3. The process shown in FIG. 3 corresponds to a first embodiment of the image processing method according to the present invention.

In FIG. 3, a step S1 inputs the input image (pixel value data). A step S2 inputs the image size of the input image, the resolution specifying information and the size of the image display region.

The division number determining unit 103 determines the division number of the image depending on the resolution specifying information (the resolution after the resolution conversion), the size of the image display region and the image size, and outputs the determined division number to the image dividing unit 102, in a step S3.

The resolution converting unit 101 carries out a resolution conversion process to convert the resolution of the input image to the specific resolution, that is, a conversion to reduce the resolution, in a step S4. The image dividing unit 102 carries out an image division process with respect to the image having the resolution after the resolution conversion, according to the division number received from the division number determining unit 103, in a step S4. Although it is generally more practical to carry out the image division after the resolution conversion, it is of course possible to carry out the image division first and thereafter carry out the resolution conversion. In other words, the order in which the image division process and the resolution conversion process are carried out is not limited to that of this embodiment, and the image division process and the resolution conversion process may be carried out in an arbitrary order.

Image segments (or divided image portions) that are obtained by the image division process of the image dividing unit 102 with the division number determined by the division number determining unit 103 are displayed in units of pages by the image display unit 104, in a step S5.

Figures 4A, 4B:
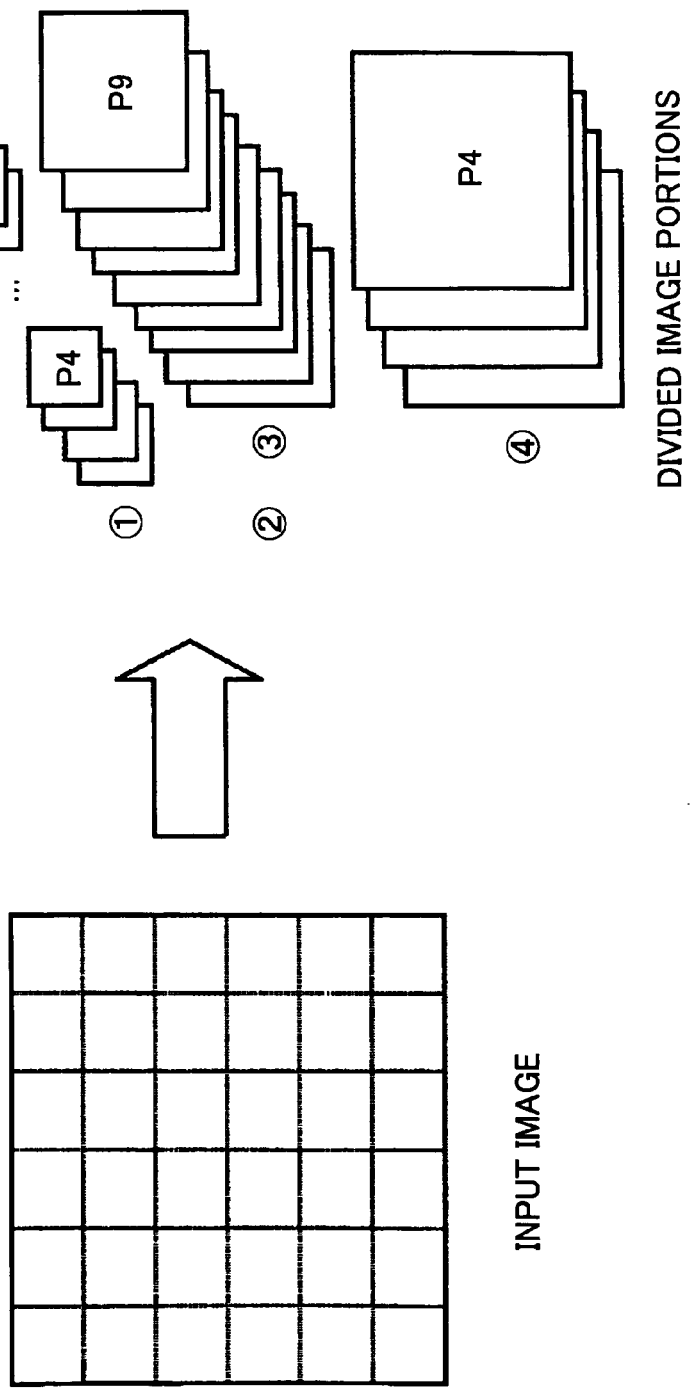
FIGS. 4A and 4B are diagrams for illustrating determination of a division number and image division of the first embodiment of the image processing apparatus.

FIGS. 4A and 4B are diagrams for explaining determination of the division number and the image division of the first embodiment of the image processing apparatus. FIG. 4A shows the determination of the division number, and FIG. 4B shows the image division.

As shown in FIG. 4A, when the resolution after the resolution conversion is high and the image display region is small, the division number is set to a large value. In this particular case shown, the input image is divided into 36 divided image portions. On the other hand, when the resolution after the resolution conversion is low and the image display region is large, the division number is set to a small value. In this particular case shown, the input image is divided into 4 divided image portions. Under intermediate conditions, the division number is set to an intermediate value. In this particular case shown, the input image is divided into 9 divided image portions.

The division number also varies depending on the image size of the input image. In a case where the image size of the input image is larger than that of the above described case, the division number becomes even larger. In other words, division number is a function of the image size of the input image, the resolution and the size of the image display region. But if the image size of the input image is constant, the division number may be controlled depending only on the resolution and the size of the image display region, and such a case also falls within the scope of the present invention.

In FIG. 4B, the input image is shown on the left side, and the divided image portions are shown on the right side. P1 through P36 denote page numbers assigned to the respective divided image portions. The image display unit 104 displays a set of divided image portions generated from one input image, in units of pages, in the image display region (window) on the screen of the display unit.

Figure 5:
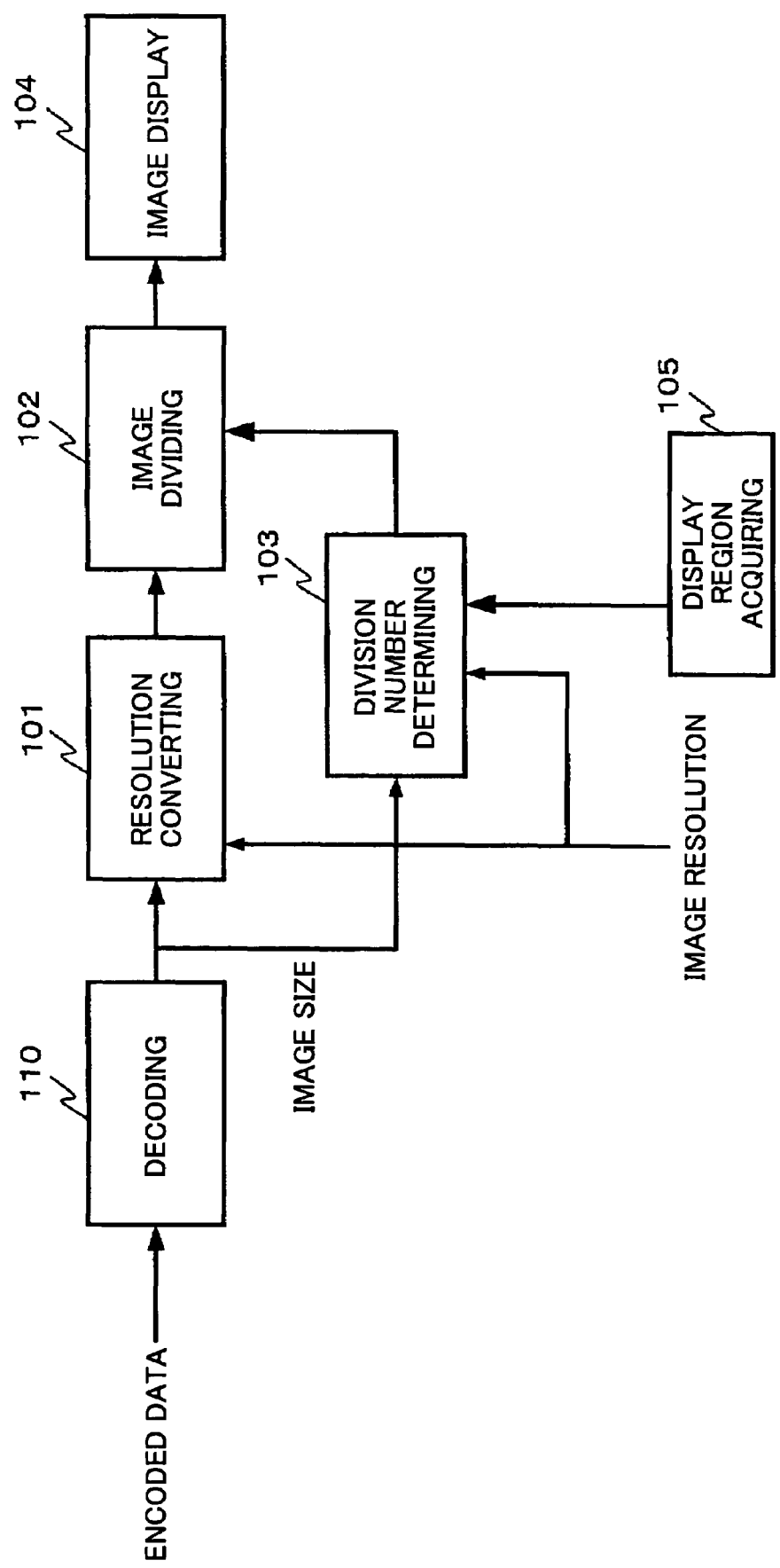
FIG. 5 is a system block diagram showing a second embodiment of the image processing apparatus according to the present invention.

FIG. 5 is a system block diagram showing a second embodiment of the image processing apparatus according to the present invention. In FIG. 5, those unit which are the same as those corresponding unit in FIG. 2 are designated by the same reference numerals, and a description thereof will be omitted.

In this embodiment, encoded data of the image are input as the input image. For this reason, in the image processing apparatus shown in FIG. 5, a decoding unit 110 is provided as a unit or means for decoding the encoded data, in addition to the resolution converting unit 101, the image dividing unit 102, the division number determining unit 103, the image display unit 104 and the display region acquiring unit 105. The resolution conversion process and the image division process are carried out with respect to pixel value data that have been decoded by the decoding unit 110.

The division number determining unit 103 determines the division number similarly to the first embodiment, and a description thereof will be omitted. In addition, the general operation of the image processing apparatus shown in FIG. 5 is basically the same as that of the first embodiment, except for the decoding process of the decoding unit 110, and a description thereof will be omitted.

Since the input image is input in the form of the encoded data, this embodiment can store large images in the form of the encoded data. For this reason, even when a large number of images having the large image size need to be processed, the large number of large images can be stored in a storage unit, in the form of the encoded data, using a relatively small storage capacity. This is an advantage over the first embodiment. An arbitrary data encoding technique may be employed to obtain the encoded data, as long as the encoded data are decodable by the decoding unit 110. Further, the data encoding technique is not limited to a hierarchical encoding technique employed by an embodiment described later in the specification.

Figure 6:
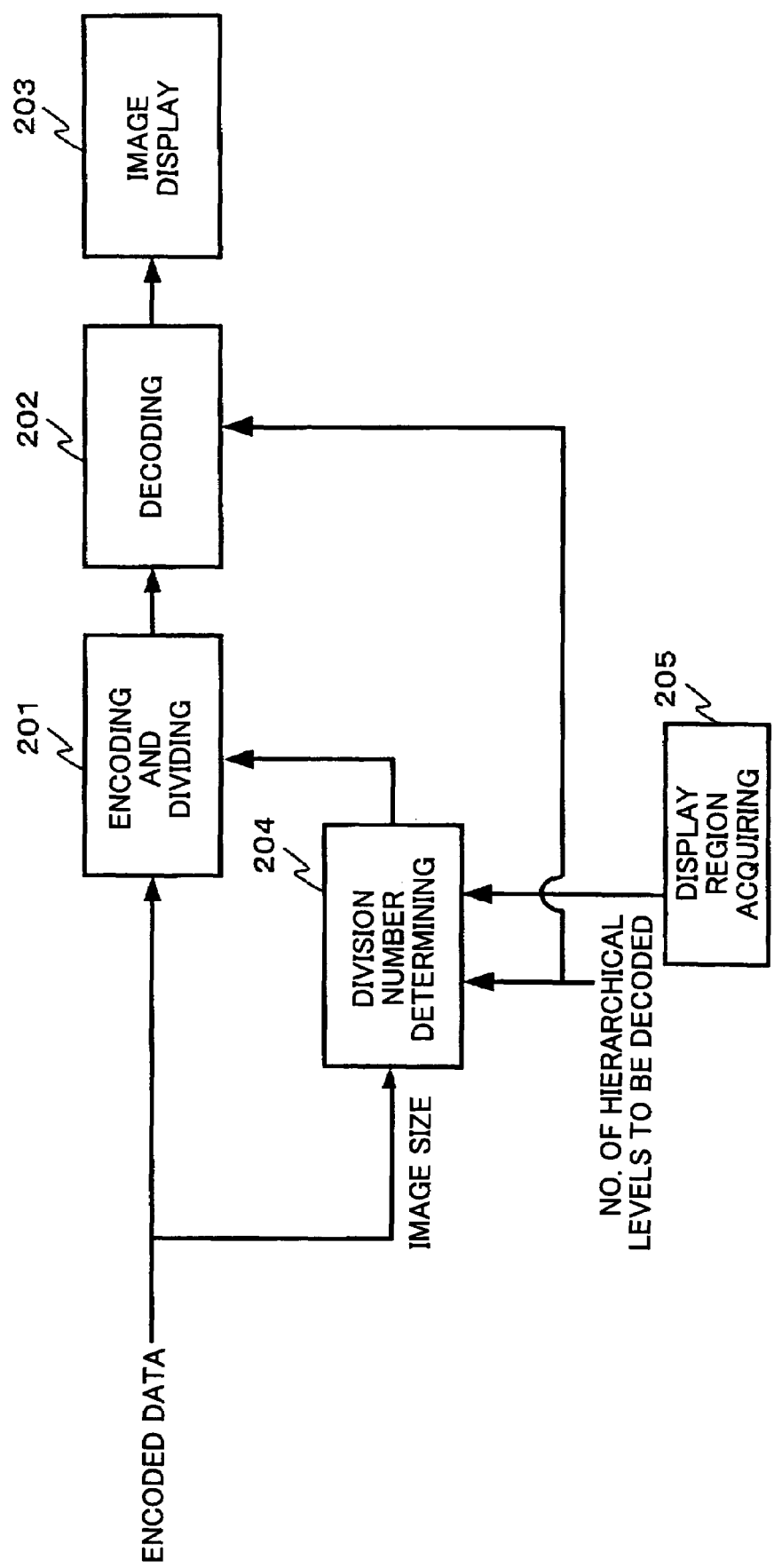
FIG. 6 is a system block diagram showing a third embodiment of the image processing apparatus according to the present invention.
Figure 7:
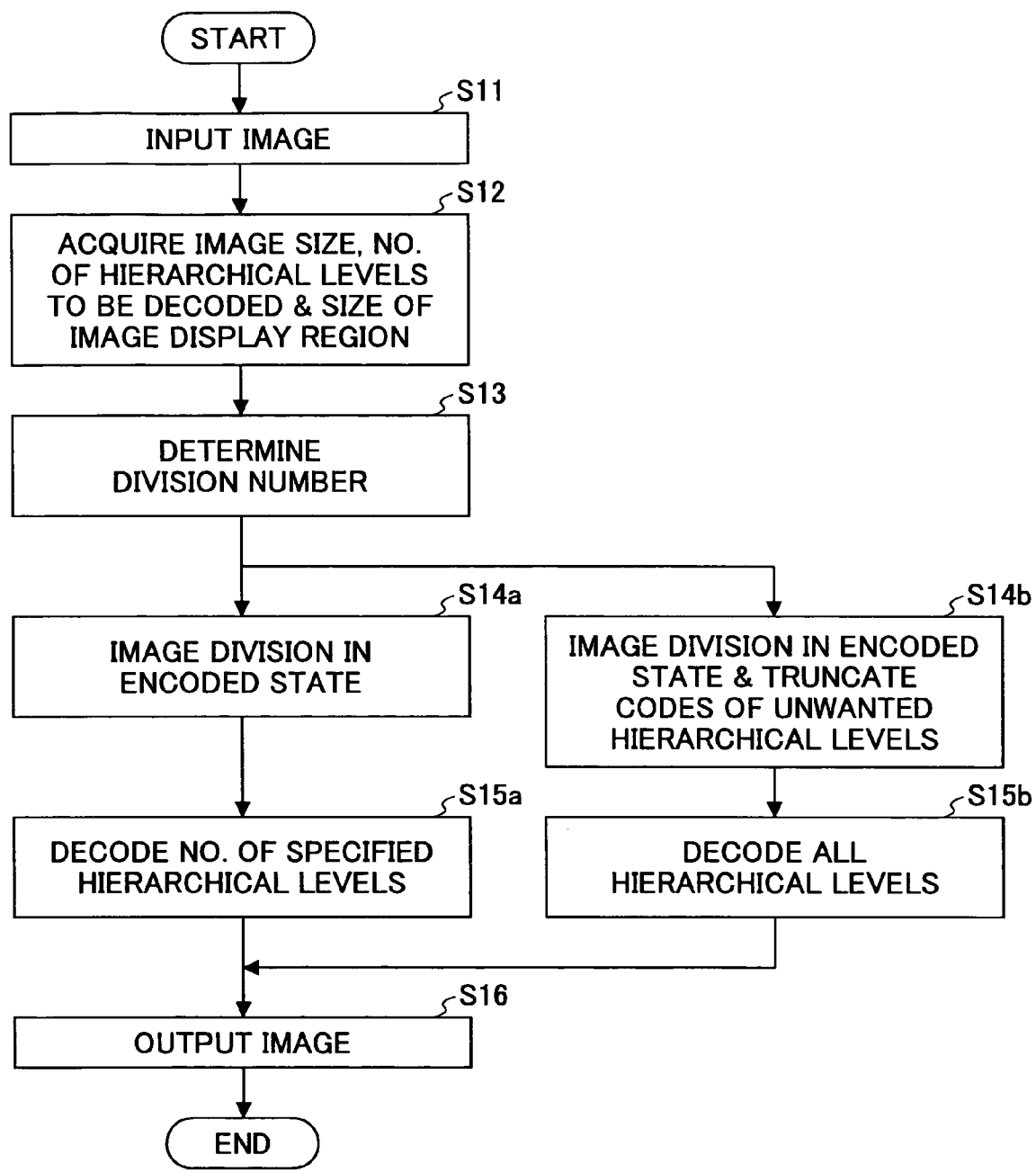
FIG. 7 is a flow chart for illustrating an operation of the third embodiment of the image processing apparatus.

FIG. 6 is a system block diagram showing a third embodiment of the image processing apparatus according to the present invention, and FIG. 7 is a flow chart illustrating an operation of the third embodiment of the image processing apparatus.

In this embodiment, hierarchically encoded data of the image are input as the input image. The hierarchically encoded data has a structure such that the resolution decreases towards a highest hierarchical level and increases towards lower hierarchical levels, and the resolution of the image that is decoded increases as the number of hierarchical levels that are decoded increases from the highest hierarchical level towards the lower hierarchical levels. Basically an arbitrary hierarchical encoding technique may be used to obtain the encoded data, but preferably, a hierarchical encoding technique that employs a wavelet transform (discrete wavelet transform) with high compression rate and small image deterioration preferably is used. One such hierarchical encoding technique is the JPEG200 which is regarded as a promising still image encoding technique to succeed the JPEG. In this embodiment, it is assumed for the sake of convenience that the encoded data input as the input image have been hierarchically encoded by the JPEG2000.

In FIG. 6, an encoding and dividing unit 201 and a decoding unit 202 form a unit or means for carrying out the functions of the resolution conversion and division block 10 shown in FIG. 1. A division number determining unit 204 forms a unit or means for carrying out the functions of the division control block 11 shown in FIG. 1.

Encoded data of the input image are input to the encoding and dividing unit 201, and an image size of the input image is input to the division number determining unit 204. Hierarchical number specifying information, which specifies a number of hierarchical levels to be decoded, is also input to the division number determining unit 204 and the decoding unit 202. The resolution of the image (image pixel value data) to be decoded by the decoding unit 202 is determined by the hierarchical number specifying information, and thus, the division number determining unit 204 determines the division number by treating the number of hierarchical levels to be decoded as information corresponding to the resolution after the resolution conversion. But similarly to the first and second embodiments described above, it is possible to input the resolution after the resolution conversion to the division number determining unit 204 in this embodiment. In this case, the hierarchical number specifying information is still input to the decoding unit 202.

The size of the image display region is also input to the division number determining unit 204. As described above, the size of the image display region refers to the size of the image displaying window that is opened on the screen of the display unit, for example. The size of the image display region may be directly specified by the user. But in this embodiment, a display region acquiring unit 205 is provided to automatically acquire the size of the image display region. For example, the display region acquiring unit 205 acquires the size of the image display region from an application program that is related to the image displaying process. The display region acquiring unit 205 forms a unit or means for automatically acquiring the size of the image display region.

An image display unit 203 regards each divided image that is output from the decoding unit 202 as one page, and displays the divided images in units of pages in the image display region of the display unit. The image display unit 203 forms a unit or means for displaying the divided images in such a manner, and the image display unit 203 may be provided externally to the image processing apparatus.

In this embodiment, the resolution conversion process and the image division process may be carried out according to a first method or a second method.

According to the first method, the encoding and dividing unit 201 converts the encoded data in the encoded state into encoded data of the divided image portions, according to the division number determined by the division number determining unit 204. The decoding unit 202 decodes the encoded data of the divided image portions, from the higher hierarchical level, for the number of hierarchical levels specified by the hierarchical number specifying information. In other words, according to this first method, the encoding and dividing unit 201 forms a unit or means for carrying out only the image division process, and the decoding unit 202 forms a unit or means for carrying out both the resolution conversion process and the decoding process. Hence, the resolution conversion process and the decoding process may be carried out simultaneously in the decoding unit 202.

On the other hand, according to the second method, the encoding and dividing unit 201 converts the encoded data in the encoded state into encoded data of the divided image portions, according to the division number determined by the division number determining unit 204, and during this process, only the codes of the higher hierarchical levels specified by the hierarchical number specifying information are used and the codes of the lower hierarchical levels are truncated. The decoding unit 202 decodes the encoded data of the divided image portions with respect to all of the hierarchical levels. In other words, according to this second method, the encoding and dividing unit 201 forms a unit or means for carrying out both the image division process and the resolution process in the encoded state, and the decoding unit 202 forms a unit or means for carrying out only the decoding process. Hence, the image division process and the resolution conversion process may be carried out simultaneously in the encoding and dividing unit 201. The hierarchical number specifying information is also input to the encoding and dividing unit 201 when employing this second method. However, it is not essential to input the hierarchical number specifying information to the decoding unit 202.

Next, a description will be given of the operation of the image processing apparatus shown in FIG. 6, by referring to FIG. 7. The process shown in FIG. 7 corresponds to a third embodiment of the image processing method according to the present invention.

In FIG. 7, a step S11 inputs the input image (hierarchically encoded data). A step S12 inputs the image size of the input image, the hierarchical number specifying information and the size of the image display region.

The division number determining unit 204 determines the division number of the image depending on the hierarchical number specifying information (the resolution), the size of the image display region and the image size, and outputs the determined division number to the encoding and dividing unit 201, in a step S13.

The steps carried out after the step S13 differ, depending on whether the first method or the second method is employed.

In a case where the first method is employed, the encoding and dividing unit 201 carries out the image division process in the encoded state, in a step S14*a*. Then, the decoding unit 202 decodes the encoded data of the divided image portion, from the higher hierarchical level, for the number of hierarchical levels specified by the hierarchical number specifying information, in a step S15*a*. In other words, the decoding process and the resolution conversion process are carried out simultaneously.

On the other hand, in a case where the second method is employed, the encoding and dividing unit 201 carries out the image division process in the encoded state, and during this process, only the codes of the higher hierarchical levels specified by the hierarchical number specifying information are used and the codes of the lower hierarchical levels are truncated, in a step S14*b*. In other words, the image division process and the resolution conversion process are carried out simultaneously. The decoding unit 202 decodes the encoded data of the divided image portions with respect to all of the hierarchical levels, in a step S15*b*.

Finally, the divided image portions are displayed in units of pages by the image display unit 203, in a step S16.

Figures 8A, 8B:
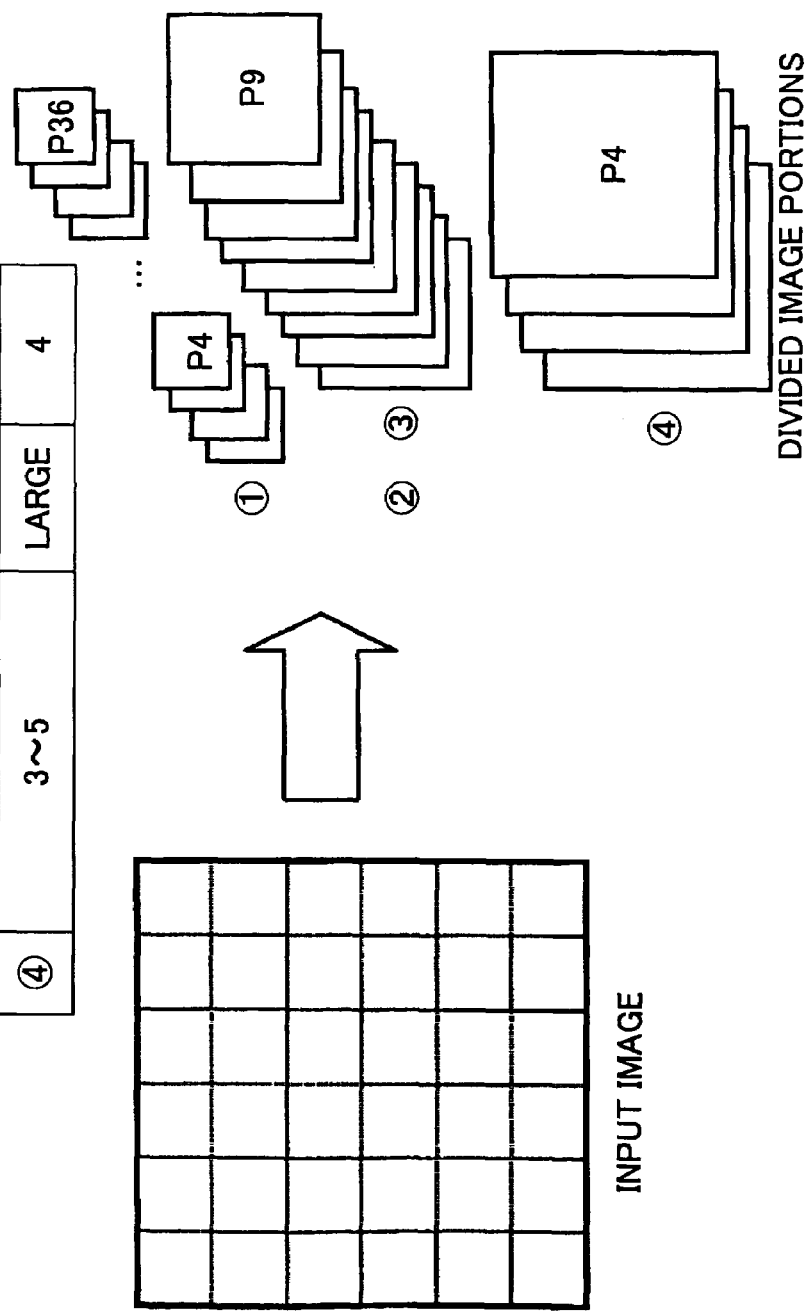
FIGS. 8A and 8B are diagrams for illustrating determination of a division number and image division of the third embodiment of the image processing apparatus.

FIGS. 8A and 8B are diagrams for explaining the determination of the division number and the image division of the third embodiment of the image processing apparatus. FIG. 8A shows the determination of the division number, and FIG. 8B shows the image division.

As shown in FIG. 8A, when the number of hierarchical levels to be decoded is 1 to 5 and the image display region is small, the division number is set to a large value. In this particular case shown, one large image is divided into 36 divided image portions. On the other hand, when the number of hierarchical levels to be decoded is 3 to 5 and the image display region is large, the division number is set to a small value. In this particular case shown, one large image is divided into 4 divided image portions. Under intermediate conditions, such as when the number of hierarchical levels to be decoded is 1 to 5 and the image display region is large or, when the number of hierarchical levels to be decoded is 3 to 5 and the image display region is small, the division number is set to an intermediate value. In this particular case shown, one large image is divided into 9 divided image portions.

The division number also varies depending on the image size of the input image. In a case where the image size of the input image is larger than that of the above described case, the division number becomes even larger. In other words, division number is a function of the image size of the input image, the number of hierarchical levels to be decoded and the size of the image display region. But if the image size of the input image is constant, the division number may be controlled depending only on the number of hierarchical levels to be decoded and the size of the image display region, and such a case also falls within the scope of the present invention.

In FIG. 8B, the input image is shown on the left side, and the divided image portions are shown on the right side. P1 through P36 denote page numbers assigned to the respective divided image portions. The image display unit 203 displays a set of divided image portions generated from one input image, in units of pages, in the image display region (window) on the screen of the display unit.

Next, a general description will be given of the JPEG2000 within a range necessary to describe the process of the encoding and dividing unit 201.

Figure 9:
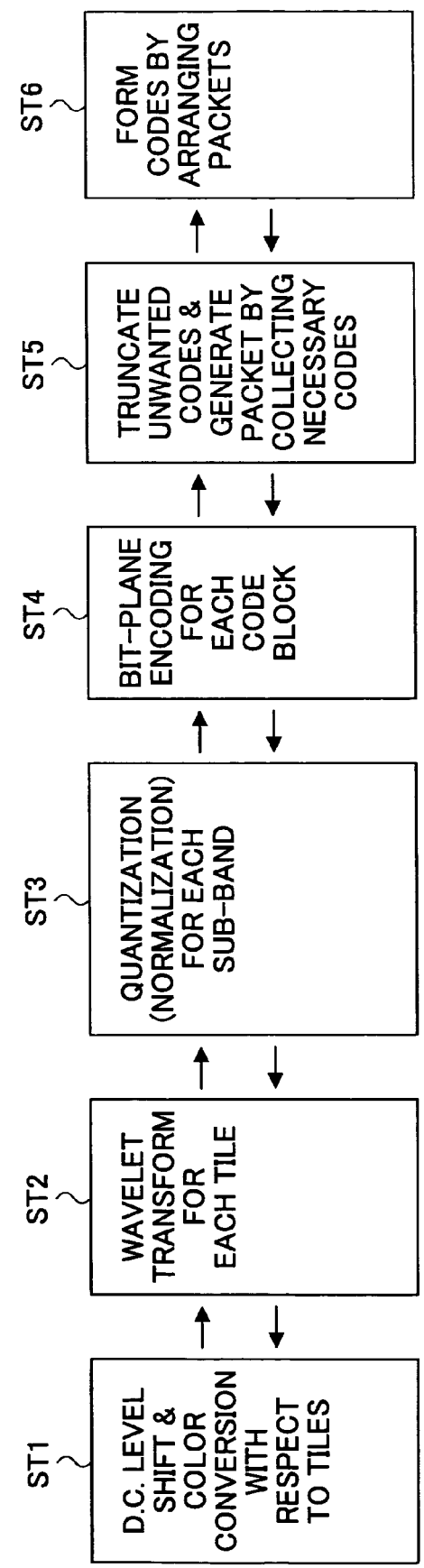
FIG. 9 is a flow chart for illustrating a basic operation of JPEG2000.

FIG. 9 is a flow chart illustrating a basic operation of the JPEG2000.

For example, when encoding a color image formed by 3 components, namely, RGB components, each component is divided into non-overlapping tiles, and the encoding process is carried out with respect to each tile of each component.

A D.C. level shift and a color conversion to a luminance and color difference component are carried out with respect to each tile, in a step ST1. However, the D.C. level shift and the color conversion are not essential.

Next, a wavelet transform (or conversion), or discrete wavelet transform (or conversion), is carried out with respect to each tile of each component, in a step ST2. According to the JPEG2000, a reversible 5×3 wavelet transform and an irreversible 9×7 wavelet transform are prescribed as the wavelet transform. A number of decomposition levels (the number hierarchical levels and the number of applications of the wavelet transform) may be specified by the user.

Wavelet coefficients are subjected to entropy encoding for each sub-band (after linear quantization if the 9×7 wavelet transform is employed), in a step ST3. Normally, in order to improve the compression efficiency, the wavelet coefficients are decomposed into bit-planes, and the entropy encoding (bit-plane encoding) is carried out in units of bit-planes, in a step ST4. To be more accurate, the bit-planes are broken down into 3 sub-bit-planes and encoded (sub-bit-plane encoding).

Of the obtained codes, unwanted codes are truncated in a step ST5, so as to gather the necessary codes and to generate a packet. Finally, the packets are arranged in a predetermined sequence, and necessary tags or tag information are added, so as to form a code stream (encoded data) having a predetermined format, in a step ST6.

The decoding process is carried out in reverse to the encoding process. In other words, the code stream is decomposed into the code stream of each tile of each component, and then returned to the wavelet coefficients by an entropy decoding. The wavelet coefficients are subjected to inverse quantization if the quantization is carried out at the time of the encoding, and then subjected to an inverse wavelet transform to obtain the pixel values. If the D.C. level shift and the color conversion are carried out at the time of the encoding, the pixel values after the inverse wavelet transform are subjected to an inverse color conversion and an inverse D.C. level shift, to obtain the original RGB pixel values.

Next, a description will be given of the entropy encoding, the packet generation and the code forming at the time of the encoding.

Figure 10:
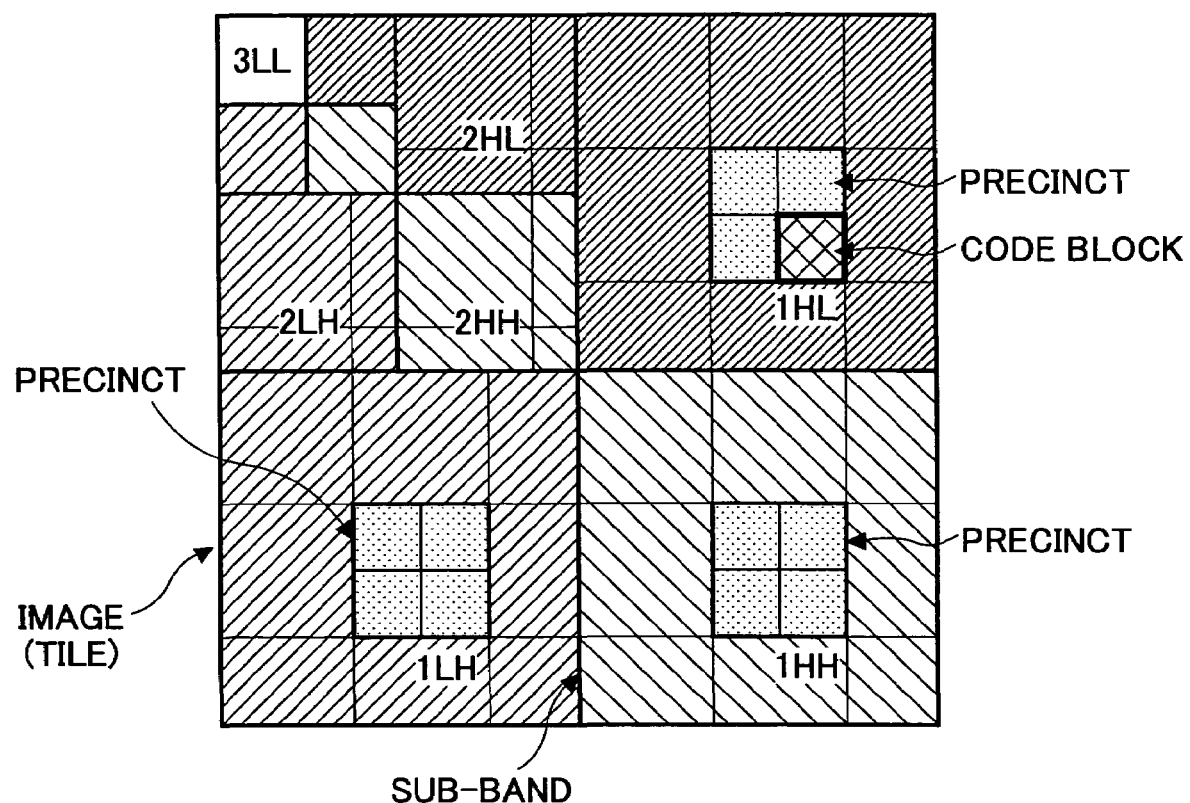
FIG. 10 is a diagram for illustrating a relationship of an image, tiles, sub-bands, precincts and code blocks of the JPEG2000.

FIG. 10 is a diagram illustrating a relationship of the image, tiles, sub-bands, precincts and code blocks of the JPEG2000. In this case, it is assumed that the tile size and the image size as the same (tile division number=1). In addition, it is assumed that the number of decomposition levels of the wavelet transform is 3. Hence, as the sub-bands, there are sub-bands 1LH, 1HL and 1HH of the decomposition level 1, sub-bands 2LH, 2HL and 2HH of the decomposition level 2, and sub-bands 3LH, 3HL and 3HH of the decomposition level 3.

The precincts are obtained by dividing the sub-band into rectangular regions having a size that can be specified by the user, and indicates a general location within the image. Of the precincts that are obtained by dividing the sub-bands HL, LH and HH, the 3 precincts located at corresponding positions of the 3 sub-bands HL, LH and HH are treated as one group. However, each precinct that is obtained by dividing the sub-band LL is treated as one group. The precincts may be set to the same size as the sub-band. Code blocks are obtained by dividing the precinct into rectangular regions having a size that can be specified by the user. Coefficients of the sub-bands are encoded for each code block.

Of all of the code blocks included in the precinct, a portion of the codes is extracted and such portions are collected to form the packet. For example, the packet is formed by collecting the codes of the bit-planes from the MSB to the third plane of all of the code blocks included in the precinct.

According to the JPEG2000, a layer structure may be employed. When the packets of all precincts (=all code blocks=all sub-bands) are collected, it is possible to form a portion of the codes of the entire image, and this portion is called a layer. For example, this portion corresponds to the codes of the bit-planes from the MSB to the third plane of the wavelet coefficients of the entire image. Generally speaking, the layer is a portion of the codes of the bit-planes of the entire image, and thus, the picture quality improves as the number of layers that are decoded increases. In other words, the number of layers may be regarded as a unit of representing the picture quality.

Figure 11:
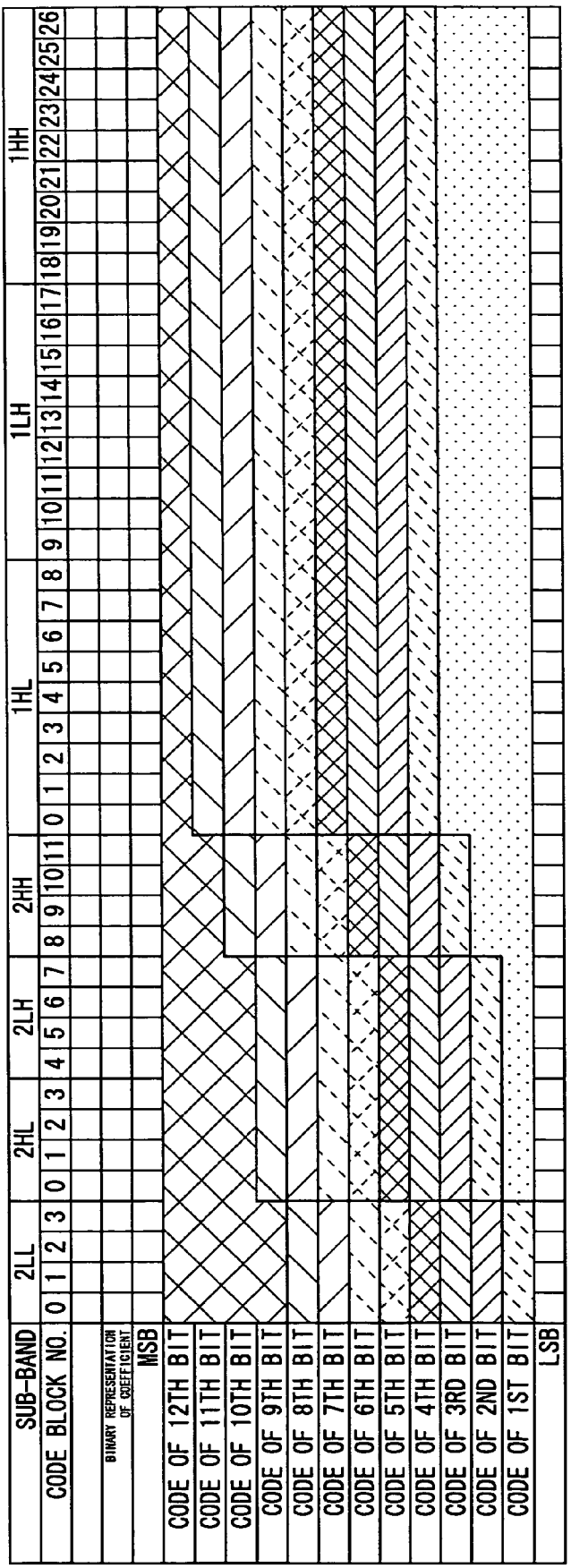
FIG. 11 is a diagram for illustrating a multi-layer structure.

FIG. 11 is a diagram illustrating a multi-layer structure. FIG. 11 shows a case where the number of decomposition levels (number of gradation levels) is 2, and the precinct size is equal to the sub-band size.

Figure 12:
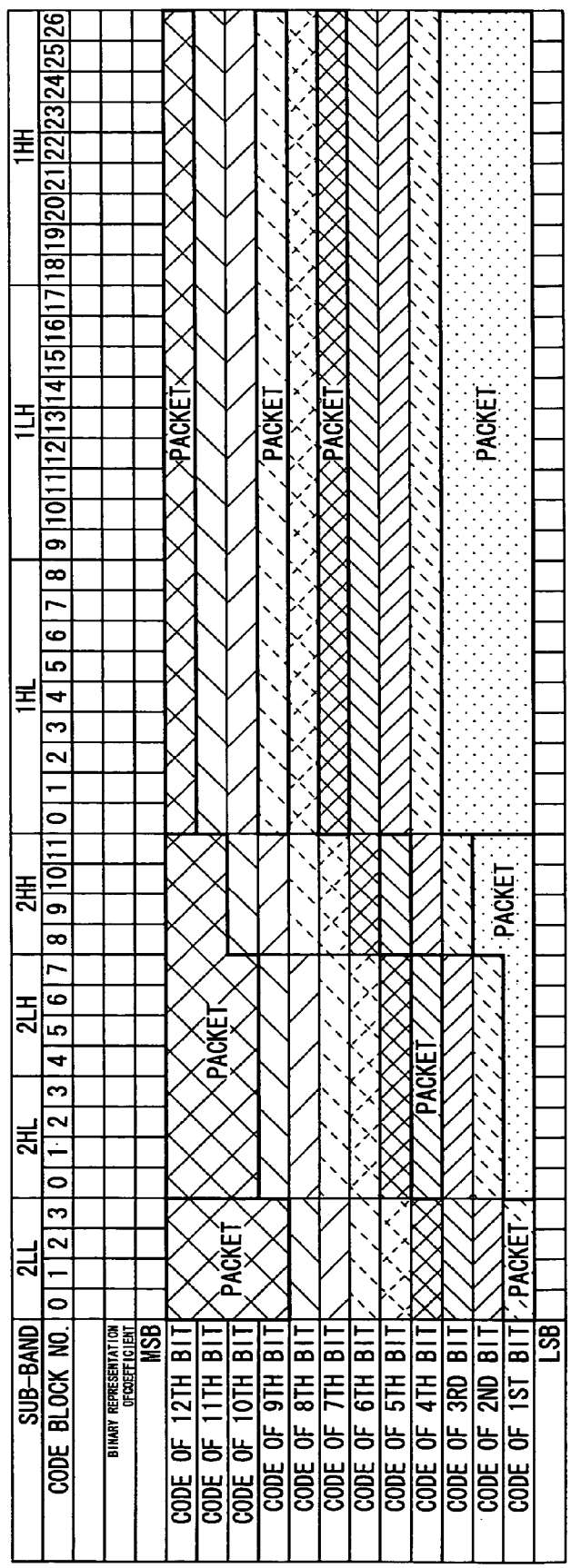
FIG. 12 is a diagram for illustrating packets included in a layer.

FIG. 12 is a diagram illustrating the packets included in the layer. In FIG. 12, the packets included in the layer are surrounded by a bold solid line. In the particular case shown, the precinct size is equal to the sub-band size. In addition, since the code blocks used have the same size as the precincts, the sub-bands of the decomposition level 2 are divided into 4 code blocks, and the sub-bands of the decomposition level 1 are divided into 9 code blocks. Since the packet is formed in units of precincts, the packet spans the sub-bands HL through HH if the precinct size is equal to the sub-band size.

The packet is a collection of the portions, where each portion is obtained by extracting the codes of the code blocks, and unnecessary codes need not be generated as the packet. For example, the codes of the lower bit-plane, such as that included in the layer 9 shown in FIG. 11, is normally truncated. Accordingly, the control of the picture quality by the truncation can be made in units of code blocks (and in units of sub-bit-planes). In other words, the picture quality control unit using the truncation is the code block. The arrangement of the packets is referred to as a progression sequence.

The JPEG2000 includes an advanced parser function capable of subjecting the encoded data to various processes in the encoded form. The encoding and dividing unit 201 can thus carry out the image division process and the resolution conversion process with respect to the encoded data using the parser function, in the encoded form.

Figure 13:
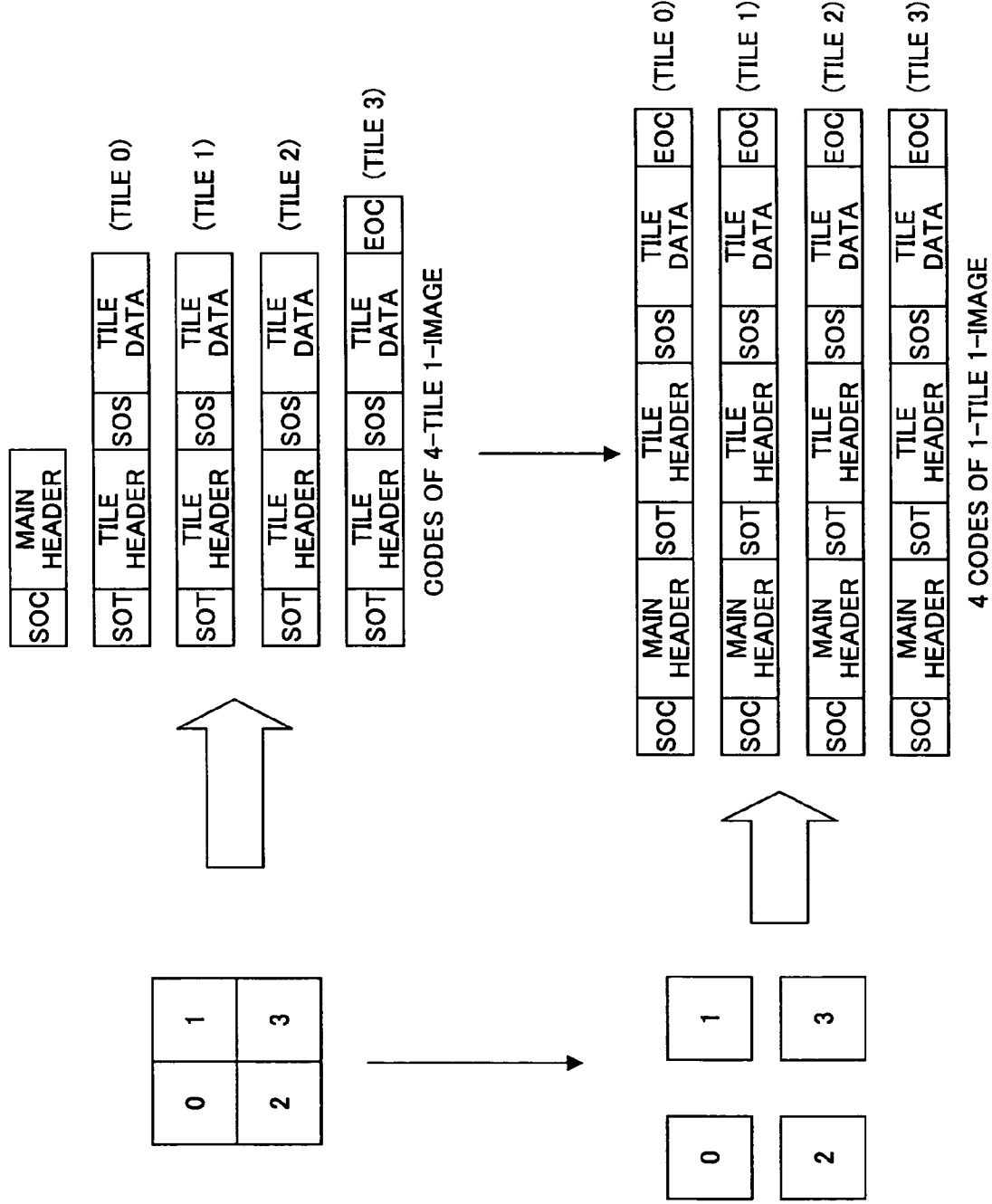
FIG. 13 is a diagram for illustrating image division in code level in the third embodiment of the image processing apparatus.

Next, a description will be given of the image division process of the encoding and dividing unit 201, by referring to FIG. 13. FIG. 13 is a diagram illustrating the image division in code level in the third embodiment of the image processing apparatus. In this particular case, it is assumed that the image is divided into 4 tiles as shown in the upper left unit of FIG. 13, and encoded data in accordance with the JPEG2000 and encoded in 2 layers (or hierarchical levels) are input as shown in the upper right unit of FIG. 13. The encoded data have a structure including an SOG tag and a main header, followed by an SOT tag, a tile header, an SOS tag and a tile data (codes, bit stream) for each of the tiles, and ending with an EOC tag. The tile data is formed by a code sequence in 2 layers.

The lower unit of FIG. 13 shows the results that are obtained when the above encoded data of the image are divided into the encoded data of the 4 divided image portions in units of tiles. The encoded data of each divided image portion have a 1-tile 1-image structure that is added with an SOC tag and a main header in front of the encoded data of the original tile and added with an EOC tag at the end. The tile data themselves remain unchanged from those before the division. In other words, only the image division process is carried out in this case, and no resolution conversion process is carried out in the encoding and dividing unit 201.

Next, a description will be given of the image division process and the resolution conversion process of the encoding and dividing unit 201, by referring to FIG. 14. FIG. 14 is a diagram illustrating the image division in code level and the resolution conversion in the third embodiment of the image processing apparatus. In this particular case, it is assumed that the image is divided into 4 tiles as shown in the upper left unit of FIG. 14, and encoded data in accordance with the JPEG2000 and encoded in 2 layers (or hierarchical levels) are input as shown in the upper right unit of FIG. 14. The tile data of each tile have the codes of each sub-band of the decomposition level 2 (codes of highest hierarchical level), and the codes of each sub-band of the decomposition level 1 (codes of second hierarchical level), which are arranged in sequence. The entire structure of the encoded data is the same as that described above in conjunction with FIG. 13.

The lower unit of FIG. 14 shows the results that are obtained when the above encoded data of the image are divided into the encoded data of the 4 divided image portions in units of tiles, and the resolution is converted into ½ the original resolution. The encoded data of each divided image portion have a 1-tile 1-image structure that is added with an SOC tag and a main header in front of the encoded data of each tile and added with an EOC tag at the end, but the codes of the decomposition level 1 (codes of second hierarchical level) that were included in the original tile data have been truncated from the encoded data. As a result of this code truncation, the resolution is converted into ½ the original resolution. Hence, in this case, both the image division process and the resolution conversion process are carried out in the encoding and dividing unit 201.

In the cases shown in FIGS. 13 and 14, the image division process is carried out in units of tiles in the encoded state. However, the encoded data in accordance with the JPEG2000 can be subjected to an image division process in units of precincts or code blocks which are smaller than the tiles. Of course, the image division process in such smaller units also fall within the scope of the present invention.

In this embodiment, the image division process is carried out in the encoded state or, the image division process and the resolution conversion process are carried out in the encoded state. For this reason, compared to the case where similar processes are carried out with respect to the pixel value data, the required storage capacity for the encoded data is smaller than that required for the pixel value data, and the processing time can also be reduced. In addition, even when a large number of images having a large image size need to be processed, the large number of large images can be stored in a storage unit, in the form of the encoded data, using a relatively small storage capacity.

FIG. 15 is a system block diagram showing a fourth embodiment of the image processing apparatus according to the present invention. In FIG. 15, those units which are the same as those corresponding units in FIG. 6 are designated by the same reference numerals, and a description thereof will be omitted.

In this embodiment, an encoding unit 210 and a storage unit 211 are provided as shown in FIG. 15, in order to store the encoded data of the divided image portions. The encoding unit 210 again encodes the pixel value data of the divided image portions output from the decoding unit 202. The storage unit 211 is formed by a hard disk drive or the like, and stores the encoded data output from the encoding unit 210.

By providing the storage unit 211 which forms a unit or means for storing the encoded data of the divided image portions, it is possible to reuse the stored encoded data of the divided image portions when the same image is to be displayed again under the same conditions. In addition, since the data that are stored are encoded data and the resolution conversion has already been made, the amount of the encoded data is small, and the storage capacity required to store the encoded data is small.

FIG. 16 is a system block diagram showing a modification of the fourth embodiment of the image processing apparatus. In FIG. 16, those units which are the same as those corresponding units in FIG. 15 are designated by the same reference numerals, and a description thereof will be omitted.

In this modification of the fourth embodiment, the storage unit 211 is also used to store the encoded data of the input image before the processing. In this case, the encoded data of the input image to be processed is read from the storage unit 211 and input to the encoding and dividing unit 201, as shown in FIG. 16. In addition, the encoded data of the divided image portions may be read from the storage unit 211 and input to the encoding and dividing unit 201 to be processed again.

As described above in conjunction with the third embodiment, the encoding and dividing unit 201 may carry out the image division process and the resolution conversion process simultaneously. In this case, the encoded data of each divided image portion, already subjected to the resolution conversion, are output from the encoding and dividing unit 201. In this case, the encoded data of each divided image portion may be stored directly in the storage unit 211, by providing a suitable data path. Hence, the encoding unit 210 may be omitted in this case.

The image processing apparatus according to the present invention may employ a server-client structure. In this case, the client may only have the image display unit, and the other processing functions may be provided in the server. Moreover, only the storage unit shown in FIG. 15 or FIG. 16 may be provided in the server, and the other processing functions may be provided in the client.

Further, the present invention is not limited to these embodiments, but various variations and modifications may be made without uniting from the scope of the present invention.

What is claimed is:

1. An image processing apparatus comprising:
a process unit to perform a resolution conversion process and an image division process with respect to an input image; and
a control unit to control a division number of the image division process depending on a size of an image display region and a resolution after the resolution conversion process, the division number indicating a number of divided image portions into which the input image is divided by the image division process, wherein the control unit controls the division number of the image division process depending on an image size of the input image in addition to the size of the image display region and the resolution after the resolution conversion process.

2. An image processing apparatus comprising:
a process unit to perform a resolution conversion process and an image division process with respect to an input image;
a control unit to control a division number of the image division process depending on a size of an image display region and a resolution after the resolution conversion process, the division number indicating a number of divided image portions into which the input image is divided by the image division process; and
a display unit to display the divided image portions in the image display region in units of pages, by regarding each divided image region as one page.

3. An image processing apparatus comprising:
a process unit to perform a resolution conversion process and an image division process with respect to an input image;
a control unit to control a division number of the image division process depending on a size of an image display region and a resolution after the resolution conversion process, the division number indicating a number of divided image portions into which the input image is divided by the image division process;
a decoding unit configured to decode encoded data of the input image, the process unit comprising:
a unit to perform the resolution conversion process with respect to pixel value data of the input image after decoding by the decoding unit; and
a unit to perform the image division process with respect to the pixel value data of the input image after the decoding by the decoding unit.

4. An image processing method comprising:
(a) performing, by a computer processor, a resolution conversion process and an image division process with respect to an input image; and
(b) controlling a division number of the image division process depending on a size of an image display region and a resolution after the resolution conversion process, the division number indicating a number of divided image portions into which the input image is divided by the image division process, wherein the controlling the divisional number controls the division number of the image division process depending on an image size of the input image in addition to the size of the image display region and the resolution after the resolution conversion process.

5. An image processing method comprising:
(a) performing, by a computer processor, a resolution conversion process and an image division process with respect to an input image;
(b) controlling a division number of the image division process depending on a size of an image display region and a resolution after the resolution conversion process, the division number indicating a number of divided image portions into which the input image is divided by the image division process; and
(c) displaying the divided image portions in the image display region in units of pages, by regarding each divided image region as one page.

6. An image processing method comprising:
(a) performing, by a computer processor, a resolution conversion process and an image division process with respect to an input image;
(b) controlling a division number of the image division process depending on a size of an image display region and a resolution after the resolution conversion process, the division number indicating a number of divided image portions into which the input image is divided by the image division process; and
(c) decoding encoded data of the input image, performing the resolution conversion process and the image division process comprising:
performing the resolution conversion process with respect to pixel value data of the input image after decoding the encoded data; and
performing the image division process with respect to the pixel value data of the input image after the decoding the encoded data.

7. An article of manufacture having one or more recordable media storing instructions thereon which, when executed by a system, cause the system to perform a method comprising:

performing a resolution conversion process and an image division process with respect to an input image; and controlling a division number of the image division process depending on a size of an image display region and a resolution after the resolution conversion process, the division number indicating a number of divided image portions into which the input image is divided into by the image division process, wherein controlling the division number controls the division number of the image division process depending on an image size of the input image in addition to the size of the image display region and the resolution after the resolution conversion process.

8. An article of manufacture having one or more recordable media storing instructions thereon which, when executed by a system, cause the system to perform a method comprising:

performing a resolution conversion process and an image division process with respect to an input image;

controlling a division number of the image division process depending on a size of an image display region and a resolution after the resolution conversion process, the division number indicating a number of divided image portions into which the input image is divided into by the image division process;

decoding encoded data of the input image; and performing the resolution conversion and image division processes procedure comprising:

performing the resolution conversion process with respect to pixel value data of the input image after decoding by the decoding procedure; and performing the image division process with respect to the pixel value data of the input image after the decoding by the decoding procedure.

* * * * *